United States Patent Office 3,379,516
Patented Apr. 23, 1968

3,379,516
HERBICIDAL COMPOSITIONS
James E. Esposito, Ambler, Pa., assignor to Amchem Products, Inc., Ambler, Pa., a corporation of Delaware
No Drawing. Original application Mar. 22, 1965, Ser. No. 441,881, now Patent No. 3,276,856, dated Oct. 4, 1966. Divided and this application Apr. 8, 1966, Ser. No. 541,089
3 Claims. (Cl. 71—94)

ABSTRACT OF THE DISCLOSURE

A concentrated herbicidal salt formulation of a dimethyl long-chain alkyl or alkenyl tertiary amine and 4-amino-3,5,6-trichloropicolinic acid wherein the picolinic acid is present in an amount of at least 17% over the stoichiometric amount required to form the amine salt.

---

This application is a division of application Ser. No. 441,881, filed Mar. 22, 1965, now U.S. Patent 3,276,856.

The present invention relates to herbicidal compositions and more particularly it relates to an improved composition having a high level of active herbicidal ingredient and improved emulsification properties.

The use of various plant hormones, particularly hormone acids for controlling undesirable vegetation is a well established industrial practice. Principally used herbicides in the industry are the halo, alkyl, haloalkyl, alkoxy, and amino substituted pyridyl, phenyl and phenoxyalkanoic acids such as, for example, 4-chloro-2-methylphenoxyacetic acid; 2,4-dichloro and 2,4,5-trichlorophenoxyacetic acids; α-(2,4-dichlorophenoxy)- and α-(2,4,5-trichlorophenoxy)-propionic acids; γ-(2,4,5-trichlorophenoxy)-butyric acid; 2-methoxy-3,6-dichlorobenzoic acid; 2-methoxy-3,5,6-trichlorobenzoic acid; 2,3,6-trichlorophenylacetic acid; 2,3,6-trichlorobenzoic acid; 2,3,5-triiodobenzoic acid; 2,5-dichloro-3-aminobenzoic acid; and 4-amino-3,5,6-trichloropicolinic acid.

Normally these herbicidal acids, in view of their substantial water insolubility and their low level of solubility in commercial agricultural solvents, are employed in the form of a derivative, such as, for example, an alkali metal or ammonium salt, an amine salt or as an ester.

Where it is desired to utilize an oil formulation of a herbicide, it has been the practice in the art to employ esters or high molecular weight amine salts in view of the greater ease in dissolving such derivatives in agricultural oils. This procedure, although generally utilized in the herbicide art, is not completely satisfactory for various reasons. For example, ester and amine formulations have necessitated the use of highly refined and specialized emulsifying agents which are very expensive and which add appreciably to the cost of the formulation. Frequently the cost of the emulsifying agent in a given formulation exceeds the cost of the active herbicidal component contained therein, so that the economics of a given herbicidal formulation might be dictated more by the additives employed than the actual active component utilized therein.

It is also known in the herbicidal art that these highly refined and specialized emulsifying agents are frequently subjected to chemical degradation by acidic components contained in the herbicidal compositions. This degradation not only results in the destruction of the essential emulsifying component, thereby yielding a formulation which will not emulsify upon field application, but it also results in reduced storage stability for such compositions thereby greatly increasing the problems encountered in attempting to ship and/or store such compositions from one season to the next.

So far as the high molecular weight amine salt herbicidal compositions are concerned these possess a lower amount of active herbicidal component than do ester formulations, so that a greater amount of herbicidal composition is needed in order to achieve the same total amount of herbicide application. Moreover, the amine salt formulations have proven undesirable in view of the toxic nature of some of the amine components employed, and also in view of corrosion problems associated with the storage and shipment of amine-type formulations.

It is also well known in the herbicidal art that while conventional oil-in-water emulsions are relatively easy to form prior to use in field application, the preferred water-in-oil type emulsions, that is emulsions wherein the oil is a continuous phase, are difficult to prepare and require an appreciable amount of work input by way of stirring and/or shearing in order to form the desired type of emulsions. This, of course, necessitates the employment of specially trained personnel and the use of specialized equipment which is not always available at the site of herbicide application.

Beyond the foregoing difficulties experienced in prior art formulations of active herbicide acids and derivatives thereof, it is also well recognized that many of the derivatives of these herbicide acids possess "biological" volatility, whereby vegetation which has not been directly contacted with the herbicidal component, but which is growing in fields near the site of application, has been found to be seriously injured and, in deed, in some cases totally destroyed by the use of such herbicidal agents.

With the foregoing in mind the principal object of the present invention is the provision of a novel herbicidal composition which is readily emulsifiable and which possesses inherent self-emulsification properties thereby obviating the need for employment of expensive and highly refined emulsifying agents, or specialized equipment and personnel.

A concomitant object of the present invention is the provision of a novel herbicidal composition which contains a high level of active herbicidal ingredient as compared with prior art formulations.

A further object of the present invention is the provision of a herbicidal composition which possesses no "biological" volatility and thereby will present no hazard to valuable crops growing in the area of herbicide application.

Yet another object of this invention is the provision of a stable, concentrated herbicidal formulation which possesses infinite storage life and which will withstand repeated freeze-thaw cycles.

The present invention is based upon the surprising discovery that a salt formed by the reaction between a tertiary amine of the formula:

$$(CH_3)_2-N-R$$

wherein R is selected from the group consisting of straight-chain alkyl and alkenyl radicals having from 12 to 18 carbon atoms with 4-amino-3,5,6-trichloropicolinic acid, is capable of dissolving appreciable quantities of excess free herbicide acid over and above that amount which stoichiometrically is required to react with the amine present therein to form the amine salt, thereby forming a concentrated herbicidal composition containing high levels of active herbicide ingredient and possessing self-emulsifying properties.

The amount of 4-amino-3,5,6-trichloropicolinic acid which is employed will be that amount which stoichiometrically is required to form the amine salt, plus at least 17% excess acid over and above this stoichiometric requirement. The exact amount of excess acid will depend upon the solubility characteristics of the particular system employed. For example, more or less of the herbicide acid will be soluble in a particular amine salt formulation with this acid, and different soubility characteristics will generally be encountered in dissolving the free herbicide acid into different amine salt formulations falling within the scope of this invention. Accordingly, the upper limit of free acid is controlled solely by solubility considerations of the particular amine selected and salt thereby produced.

With respect to the tertiary amine, this component must be selected from that group of saturated and unsaturated straight-chain dimethylalkylamines having from 12 to 18 total carbon atoms in the alkyl chain. Typical amines falling within the scope of this invention include N,N-dimethyldodecylamine; N,N - dimethyltetradecylamine; N,N - dimethylhexadecylamine; N,N - dimethyloctadecylamine; and N,N-dimethyloctadecadienylamine.

The compositions of the present invention are prepared by dissolving the free 4-amino-3,5,6-trichloropicolinic acid directly into the particular tertiary amine component desired to be used. If the amine is very viscous at room temperature, and difficult to flow, it may be warmed to higher temperatures in order to permit easier handling thereof. The preferred practice comprises utilization of a solution of the desired amine component in an agricultural oil to which the acid is then added. However, utilization of an agricultural oil is not essential for the successful operation of the present invention, and normally is utilized where the viscosity of a particular amine employed, or the amine salt produced, is such as to render difficult routine handling of the composition.

A preferred practice consists in the utilization of mixtures of commercially available amines falling within the scope of this invention. Such combinations include both saturated and unsaturated amines having long-chain alkyl groups of from 16 to 18 total carbons atoms. Amine admixtures of this type have given results which are completely acceptable and equivalent to those obtained using a single tertiary amine component. Moreover, the use of commercially available mixtures of amines from the class described is a more economical practice and thus is preferred for this reason.

The agricultural oils which may, if desired, be utilized in preparing the novel, concentrated, herbicidal compositions of this invention include aromatic oils such as, methylated naphthalenes, and alkylated benzenes, such as xylenes and toluenes. The primary function of these agricultural oils is to lend fluidity to the herbicidal compositions which, in certain instances, tend to be very viscous and difficult to flow under normal handling conditions.

Where such oils are utilized it is preferred to incorporate up to about 70% by weight thereof based upon the weight of the formulation. However, as noted hereinabove, formulations falling within the purview of this invention can be prepared without the benefit of the agricultural oil or co-solvent.

The discovery of this invention is particularly surprising when it is considered that 4-amino-3,5,6-trichloropicolinic acid is substantially insoluble, or at best, only sparingly soluble, in agricultural oils, so that the surprising solubility of the amine salt formulations for additional picolinic acid compound is attributed solely to the amine salt compositions rather than to any agricultural oils which may be used. Accordingly, the ability of these amine salts to dissolve excess free 4-amino-3-5,6-trichloropicolinic acid, beyond that amount which stoichiometrically is required to form the amine salt, is attributed to the amine salt compounds per se and is not in any way attributed to solvency properties of any agricultural oils which may be incorporated into the compositions of this invention.

In order to illustrate the surprising properties of the present invention there are presented below the results of several formulations which have been prepared in accordance with the teachings of this invention. It is to be understood, however, that these formulations are presented herewith solely by way of illustration and are not intended in any way to be construed as a limitation of this invention.

Example I 6.0 grams (0.0203 mol) of N,N-dimethyloctadecenyl-amine were added to 80 grams of mixed xylene fractions. To this admixture were then added 6.0 grams (0.0248 mol) of 4-amino-3,5,6-trichloropicolinic acid with stirring, at room temperature, to yield a clear solution. This formulation contained 22.2% excess free acid over and above that amount which stoichiometrically was required to form the amine salt.

Upon simple admixture of this formulation with water in ratios of 1 part of the concentrated formulation to 3 parts of water, using mixing, a water-in-oil emulsion was rapidly formed which emulsion was stable and could be used "as is" for spray application.

Example II 12.0 grams (0.0406 mol) of N,N-dimethyloctadecenyl-amine were added to 80 grams of mixed xylene fractions, with stirring at room temperature, to yield a complete solution. To this mixture was then added 12.0 grams (0.0497 mol) of 4-amino-3,5,6-trichloropicolinic acid, with stirring, until complete solution was obtained. This particular formulation contained 22.4% of excess free acid over and above that amount which stoichiometrically was required to form the amine salt.

Simple admixture of the formulation of Example II with water in a ratio of 1 part of the formulation to 2 parts of water resulted in a rapidly formed water-in-oil emulsion which was stable and suitable for conventional spray applications.

From the formulations presented above it is apparent that it is possible within the purview of this invention to form concentrated herbicidal compositions possessing unusually high rates of active herbicide component and, moreover, possessing self-emulsification properties heretofore unkown in the industry.

I claim:

1. A herbicidal formulation comprising a herbicidally effective amount of an amine salt composition consisting of the reaction product of a tertiary amine of the formula:

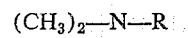

$$(CH_3)_2—N—R$$

wherein R is selected from the group consisting of straight-chain alkyl and alkenyl radicals having from 12 to 18 carbon atoms with 4-amino-3,5,6-trichloropicolinic acid, wherein said picolinic acid is present in an amount of at least 17% above that quantity which stoichiometrically is required to form the amine salt.

2. The amine salt composition of claim 1 wherein the tertiary amine component comprises admixtures of straight-chain alkyl and alkenyl amines having from 16 to 18 carbon atoms in the said alkyl and alkenyl chains.

3. A herbicidal formulation comprising a herbicidally effective amount of an amine salt composition consisting of the reaction product of a tertiary amine of the formula:

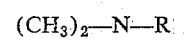

$$(CH_3)_2—N—R$$

wherein R is selected from the group consisting of straight-chain alkyl and alkenyl radicals having from 12 to 18 carbon atoms with a herbicidally effective amount of 4-amino-3,5,6-trichloropicolinic acid, wherein said picolinic acid is present in an amount of at least 17% above that quantity which stoichiometricaly is required to from the amine salt, said formulation also comprising up to 70% by weight of a liquid inert diluent.

References Cited

UNITED STATES PATENTS 2,900,411    8/1959    Harwood et al. _____ 71—2.6 X

FOREIGN PATENTS 628,487    8/1963    Belgium.

JAMES O. THOMAS, JR., *Primary Examiner.*